United States Patent [19]

Reischl et al.

[11] 4,186,118

[45] Jan. 29, 1980

[54] PROCESS FOR THE PREPARATION OF MODIFIED AQUEOUS SYNTHETIC RESIN DISPERSIONS

[75] Inventors: Artur Reischl; Wolfgang Wenzel; Dieter Dieterich, all of Leverkusen, Fed. Rep. of Germany

[73] Assignee: Bayer Aktiengesellschaft, Leverkusen, Fed. Rep. of Germany

[21] Appl. No.: 875,958

[22] Filed: Feb. 8, 1978

[30] Foreign Application Priority Data

Feb. 26, 1977 [DE] Fed. Rep. of Germany ....... 2708442

[51] Int. Cl.$^2$ ..................... C08L 75/02; C08L 75/04
[52] U.S. Cl. ........................ 260/29.2 TN; 528/52; 525/453; 525/457
[58] Field of Search ............... 260/29.2 TN, 77.5 TB; 528/46, 47, 52

[56] References Cited

U.S. PATENT DOCUMENTS

| | | | |
|---|---|---|---|
| 3,479,310 | 11/1969 | Dieterich et al. | 260/29.2 TN |
| 3,756,992 | 9/1973 | Dieterich | 260/29.2 TN |
| 3,905,929 | 9/1975 | Noll | 260/29.2 TN |
| 4,008,196 | 2/1977 | Matsuda et al. | 260/29.2 TN |
| 4,016,120 | 4/1977 | Matsuda et al. | 260/29.2 TN |
| 4,028,313 | 6/1977 | Müller et al. | 260/29.2 TN |
| 4,046,729 | 9/1977 | Scriven et al. | 260/29.2 TN |

FOREIGN PATENT DOCUMENTS

| | | |
|---|---|---|
| 1495745 | 6/1964 | Fed. Rep. of Germany . |
| 1184946 | 1/1965 | Fed. Rep. of Germany . |
| 1953345 | 4/1971 | Fed. Rep. of Germany . |
| 1953349 | 4/1971 | Fed. Rep. of Germany . |
| 1953348 | 5/1971 | Fed. Rep. of Germany . |
| 2014385 | 10/1971 | Fed. Rep. of Germany . |
| 2314512 | 10/1974 | Fed. Rep. of Germany . |
| 2344135 | 3/1975 | Fed. Rep. of Germany . |
| 2446440 | 4/1976 | Fed. Rep. of Germany . |
| 1076688 | 6/1967 | United Kingdom . |

OTHER PUBLICATIONS

*Journal of the Oil and Color Chemists Association,* 53, Jan. 1970, pp. 363–379.
*Angewandte Chemie,* 82, 1970, pp. 53–63.
*Die Angewandte Makromolekulare Chemie,* 26, 1972, pp. 85–106.
*Advan. Urethane Sci. Technol.,* 4, 1976, pp. 112–131.

*Primary Examiner*—Allan Lieberman
*Attorney, Agent, or Firm*—Gene Harsh; Joseph C. Gil; R. Brent Olson

[57] ABSTRACT

A process for preparing modified aqueous synthetic resin dispersions, comprising introducing organic diisocyanates which are liquid at room temperature into polyurethane-containing, non-sedimenting, aqueous synthetic resin dispersions, optionally in the presence of catalysts which accelerate the isocyanate polyaddition reaction and/or the dimerization of isocyanate groups and/or the carbodiimidization of isocyanate groups and/or the trimerization of isocyanate groups, mixing the organic diisocyanate with the aqueous dispersion at a temperature at which no visible foaming occurs, maintaining the temperature after addition of all the diisocyanate until at least 50% of the isocyanate groups in the added diisocyanate have undergone reaction and, if desired, completing the reaction by subsequently heating to temperatures up to 100° C.

These modified aqueous dispersions contain dispersed latex particles which are enveloped with polyurea formed from the diisocyanates. These modified dispersions are useful as water-resistant surface coatings and leather dressings which are abrasion resistant in the wet.

6 Claims, No Drawings

PROCESS FOR THE PREPARATION OF MODIFIED AQUEOUS SYNTHETIC RESIN DISPERSIONS

BACKGROUND OF THE INVENTION

The preparation of aqueous, stable, i.e. non-sedimenting, dispersions of anionic, cationic or non-ionic polyurethanes which have been modified to render them hydrophilic has been known for a long time (see, for example, British Pat. No. 1,076,688, German Pat. No. 1,184,946, German Auslegeschrift No. 1,495,745, German Offenlegungsschriften Nos. 1,495,847; 2,035,732; 2,344,135 and 2,446,440 and U.S. Pat. Nos. 3,479,310; 3,756,992 and 3,905,929; "DIE ANGEWANDTE MAKROMOLEKULARE CHEMIE" 26 1972, pages 85 to 106; "ANGEWANDTE CHEMIE", 82, 1970, pages 53–63; J. Oil Col. Chem. Assoc. 1970, 53, pages 363–379; Advan. Urethane Sci. Technol. 4, 1976, pages 112–131).

In some of these literature references, it is also indicated that polyisocyanates may be incorporated in the aqueous polyurethane dispersions; German Offenlegungsschrift No. 1,495,847, for example, recommends inter alia the addition of polyisocyanates as a cross-linking agent before the dispersions are worked-up into shaped products. U.S. Pat. No. 3,756,992 also contains a reference to the fact that free polyisocyanates having molecular weights of from 110 to approximately 4000 may be added to the dispersions described therein. This addition of polyisocyanates is obviously also intended to bring about cross-linking of the dispersed polyurethanes.

DESCRIPTION OF THE INVENTION

It has now surprisingly been found that the properties useful for the practical application of stable, aqueous polyurethane dispersions which are preferably free from emulsifiers and may contain water-dispersible polymers may be considerably improved by incorporating specially selected diisocyanates in the dispersions by a particular method to be described in detail below. This addition of diisocyanates causes the dispersed latex particles to be enveloped with polyurea formed from the diisocyanates.

The present invention relates to a process for the preparation of modified aqueous synthetic resin dispersions, characterized in that organic diisocyanates which are liquid at room temperature are introduced into non-sedimented, aqueous synthetic resin dispersions containing polyurethanes, optionally in the presence of catalysts which accelerate the isocyanate polyaddition reaction and/or the dimerization of isocyanate groups and/or the carbodiimidization of isocyanate groups and/or the trimerization of isocyanate groups and at the same time the reactants are mixed together at a temperature at which no visible foam formation takes place. This temperature condition is maintained after addition of the diisocyanate until at least 50% of the isocyanate groups in the added diisocyanate have reacted. If appropriate, the reaction is subsequently completed by heating to temperatures of up to 100° C.

The present invention also relates to modified synthetic resin dispersions obtainable by this process and to the use thereof for coating flexible and rigid substrates.

The aqueous synthetic resin dispersions used in the process according to the present invention are preferably emulsifier-free, non-sedimenting dispersions having a solids content of from 10 to 60%, by weight, preferably from 20 to 50%, by weight, although mixtures of such polyurethane dispersions with dispersions of polymerization products which optionally contain emulsifiers may also be used in the process of the present invention. If such mixtures are used, the total solids content thereof may be from 10 to 60%, by weight, preferably from 20 to 50%, by weight, and the proportion of other polymerisation products, based on the total solids content, may be up to 70%, by weight, preferably up to 50%, by weight. By "non-sedimenting" dispersions are meant, in this context, synthetic resin dispersions which have formed no visible precipitate after 4 weeks' storage at 20° C.

Any aqueous polyurethane dispersions which satisfy these conditions are suitable for the process according to the present invention, regardless of whether they are anionic, cationic and/or non-ionic hydrophilically modified polyurethanes and regardless of whether the dispersed latex particles are spherical, fibrous or in the form of platelets. The preparation of such polyurethane dispersions is well known in the art and may be carried out, for example, by processes described in the literature mentioned above.

Up to 70% by weight based on the mixture of polymer dispersions refers to the fact that aqueous dispersions of non-polyurethane polymerisation products may be mixed with the poly-urethane dispersions before the process according to the present invention is carried out. These include any polymer dispersions compatible with the polyurethane dispersions, for example those described in German Offenlegungsschriften Nos. 2,014,385; 1,953,345; 1,953,348 and 1,953,349. In principle, any polymer latices which are compatible with the polyurethane dispersions may be used, for example those based on natural or synthetic rubber, styrene-butadiene copolymers, polymers of 2-chlorobutadiene, styrene-acrylonitrile copolymers, polyethylene chlorosulphonated or chlorinated polyethylene, butadieneacrylonitrile copolymers, butadiene-methacrylate copolymers, polyacrylic acid esters, PVC or ethylene-vinyl acetate copolymers which may be partially saponified.

Particularly preferred polymer latices are those based on polyacrylonitrile, on butadiene-acrylonitrile copolymers or on grafted copolymers based on acrylonitrile, butadiene and styrene, as well as those based on poly(meth)acrylates.

Diisocyanates suitable for the process according to the present invention are organic diisocyanates which are liquid at room temperature and have a maximum average molecular weight of 400, preferably 300. Diisocyanates in which the isocyanate groups have differing reactivities are preferred. The following are examples of suitable diisocyanates, which may also be used in the form of mixtures: 2,4-diisocyanatotoluene, 2,6-diisocyanatotoluene, 4,4'-diisocyanatodiphenylmethane which has been liquefied and partly made unsymetrical, by reaction with subequivalent quantities of tripropylene glycol or tetrapropylene glycol (NCO/OH molar ratio from 1:0.1 to 1:0.3), 4,4'-diisocyanatodiphenylmethane liquefied by partial carbodiimidization of the isocyanate groups. 1-methyl-2,4-diisocyanatocyclohexane, 1-methyl-2,6-diisocyanatocyclohexane, 1-isocyanato-3,3,5-trimethyl-5-isocyanatomethylcyclohexane, 4,4'-diisocyanato-dicyclohexylmethane and hexamethylenediisocyanate or its reaction product with subequivalent quantities of low molecular weight glycols, such as 1,2-dihydroxypropane or dipropylene or tripropylene glycol. 2,4-diisocyanatotoluene and the cycloaliphatic diisocyanates exemplified above are among the preferred diisocyanates.

Diisocyanates which have a substantially higher average molecular weight than 400 and trifunctional and higher functional polyisocyanates are less suitable and may at most be added in minor quantities. Monoisocyanates such as i.e. stearyl or phenyl isocyanate may also be used in quantities of up to about 5 NCO-equivalent-% in admixture with the diisocyanates.

To carry out the process according to the present invention, the synthetic resin dispersion which is to be modified is introduced into a reaction vessel which may be heat controlled and which is equipped with a stirrer or other mixing device and the diisocyanate is introduced at such a temperature preferably in the range of from 0° to 50° C., most preferably from 10° to 30° C., at which foam formation is not yet observed. This temperature at which foam formation is not yet observed depends on the quantity of diisocyanate as well as on the reactivity of the diisocyanate which is used. The temperature is generally within the ranges indicated and can easily be determined by a preliminary test. The introduction of diisocyanate is accompanied by mixing of the components. These conditions are maintained after complete addition of the diisocyanate until at least 50% of the isocyanate groups in the diisocyanate introduced have been used up. If desired, the reaction may then be completed by heating to temperatures of up to 100° C.

The quantity of diisocyanate to be used in the process according to the present invention is from 1.5 to 80%, by weight, preferably from 3 to 50%, by weight, based on the total solids content in the modified synthetic resin dispersion. In the case of hexamethylene diisocyanate, the preferred quantity is from 1.5 to 5%, by weight.

Exact observance of the temperature conditions set forth above is essential for obtaining the effect desired according to the present invention of enveloping the latex particles in the dispersion with a layer of polyurea. Otherwise, unwanted reactions, such as the formation of polyureas which do not envelope the latex particles, but occur side-by-side with the polyurethane particles or cross-linked reactions accompanied by coagulation of the dispersed synthetic resin must be expected.

In addition to the temperature control during and after addition of the diisocyanate, the intensity of mixing and pressure conditions during evolution of carbon dioxide also have a certain significance since the reaction must always be carried out in such a way that the mixture does not foam up. In many cases, however, it is advantageous to apply a slight vacuum to remove the carbon dioxide evolved.

When carrying out the process according to the present invention, it may be advantageous to add known catalysts which accelerate the isocyanate reaction, particularly if the reaction temperature is kept low.

Suitable catalysts include, in particular, tertiary amines which accelerate the isocyanate addition reaction, such as triethylamine or tributylamine, N-methyl-diethanolamine, dimethylethanolamine and triethanolamine.

In certain cases, it may also be advantageous to add catalysts which accelerate the dimerization and/or trimerization reaction of isocyanate groups, such as tributylphosphine, and catalysts which accelerate the carbodiimidization of isocyanate groups, such as phospholine oxide. All these catalysts are generally used in quantities of from 0.2 to 10%, by weight, preferably from 1 to 5%, by weight, based on the quantity of diisocyanate provided for the modification.

Instead of using mixtures of polyurethane dispersions and polymer dispersions, a pure polyurethane dispersion may first be used for the process according to the present invention and the partially modified dispersion may subsequently be mixed with a suitable polymer dispersion of the type exemplified above, either during or after completion of the reaction according to the present invention. Synthetic resin dispersions which are prepared in this way also have significant advantages for practical application compared with the corresponding unmodified synthetic resin dispersions.

In analogous manner, synthetic resin dispersions which are modified according to the present invention may be mixed with the conventional polyurethane dispersions, e.g. in order to improve the hand and strength of the product while preserving the advantageous film-forming properties.

As mentioned above, the process according to the present invention enables the dispersed latex particles to be enveloped with a film of polyurea, which is advantageous from the point of view of application of the product, particularly in increasing the tensile strength, abrasion resistance and water and high temperature resistance and improving the hand, reducing the tendency to crystallization or preventing blocking effects in sheets produced from such dispersions without reducing the stability of the dispersions in storage.

The modified dispersions according to the present invention may be used basically for the same purposes as the unmodified dispersions from which they are obtained, for example for producing flexible, homogeneous or microporous coatings on paper; textiles or natural and synthetic leather; as adhesives or impregnating agents; as comparatively inflexible or completely rigid coatings, such as lacquers for wood or metals; or as sizes for glass fibers or for enveloping pigments. The products are preferably applied in the aqueous phase, but in certain cases, they may also be applied as very fine powders. They may, of course, also be formed into films which are stripped from the support when formed. The particular advantage of the polyurea modification according to the present invention lies in the fact that the properties of the dispersions are thereby improved to a surprising extent so that in many cases it is possible to make use of exceptionally inexpensive dispersions or mixtures thereof which have previously been unsuitable. Aqueous dispersions are frequently unsuitable for use on account of the excessive sensitivity thereof to water, for example if they are required as coating layers. With the process according to the present invention it is possible, as will be shown in the Examples, to convert unusable dispersions into water-resistant surface coatings or even into leather dressings which are abrasion resistant in the wet by enveloping the dispersion particles with polyurea. Furthermore, a group of products which vary in the properties thereof to suit each individual case exactly may be produced according to the present invention from a single dispersion. For example, when applying several coats on top of each other to the same substrate, the unmodified aqueous primary dispersion may be used as an undercoat to adhere to the textile. Also, dispersions based on the same primary dispersion, but improved by the polyurea envelope and adjusted to the particular purpose, may be used for the second or surface coating and optionally also for a third coating or finish. Alternatively, the aqueous primary dispersion may be exposed to the action of varying quantities of one or more diisocyanates so that the dispersion may be adapted for use with different substrates, such as paper, textiles, natural or synthetic leather, wood, steel or glass (fibers), and adapted for different techniques of application. In all cases, good quality coatings are obtained. A polyurethane dispersion enveloped with polyurea according to the present invention and containing a high proportion of polyurea may also be varied in its properties by stirring any unenveloped latices into it. For example, a dispersion which has been enveloped and improved with polyurea and optimized as a surface coating may be mixed with a soft polyacrylate latex and used as an adherent undercoat for the same leather.

Homogeneous coatings may be obtained on any substrates by application with a doctor wiper, casting or spraying by the direct or reversal processes. Coatings on flexible or rigid materials may also be produced by immersion. Foils free from supports may be obtained, for example, by applying the products according to the present invention to a separating paper or strip of steel using a doctor wiper and then stripping off the support after removal of the water in a heating channel.

The synthetic resin dispersions modified according to the present invention are also particularly suitable for the production of very finely divided powders having particle sizes of from 1 to 5 $\mu$m by freeze-drying, spray drying or flow drying. These powders may be applied to substrates either directly or in the form of secondary dispersions after they have been mixed with water or any other dispersing agent. In certain cases, these powders may be suspended in organic media which have reactive groups capable of undergoing polyaddition reactions. Polyols or polyisocyanates, for example, may be used as secondary dispersing medium for further reactions. In special cases the aqueous synthetic resin dispersions modified according to the present invention can be admixed with polyhydroxyl compounds of low or high molecular weight having a higher boiling point than water and the water is subsequently removed i.e. by distillation under reduced pressure, so that the added polyhydroxyl compound remains behind as a secondary dispersing medium. Solvents, optionally containing synthetic resins in solution may be used as inert organic media.

EXPERIMENTAL SECTION

General Experimental Directions

When mixing the components, excessive foaming may be prevented if the diisocyanate, which is usually hydrophobic, is rapidly and finely emulsified in the aqueous dispersion while stirring in as little air as possible, preferably none at all. This may be achieved by bringing the components together at given temperatures in a very efficient static mixer, for example, in a Kenics mixer or in a dynamic continuous flow mixer which has a very short residence time. In many cases, it is sufficient to first emulsify the diisocyanate with only part of the aqueous dispersion, for example, from 20 to 40%, by weight, of the total quantity of dispersion. This premix is then introduced into the conventional stirrer-equipped apparatus containing the remaining quantity of dispersion and the mixture is slowly stirred at a slightly reduced pressure (from 300 to 600 Torr) so that the diisocyanate remains finely emulsified. The reaction mixture is then gradually adjusted to the temperature at which the diisocyanate reacts only slowly with water, with evolution of carbon dioxide. The reaction temperatures indicated in the experimental Examples refer to the reaction of the major portion, from approximately 80 to 95%, by weight, of the total quantity of isocyanate (5) and the remainder (6). Aqueous PUR dispersions prepared from the acetonic solution have an acetone content below 1%, by weight, preferably below 0.5%, by weight.

LABORATORY METHODS

METHOD I

The whole diisocyanate is introduced at once, at as low a temperature as possible, straight into the liquid phase of the total quantity of dispersion which has previously been introduced into a conventional laboratory stirrer and optionally diluted with water. The diisocyanate is finely emulsified in this dispersion by stirring very rapidly during the rapid addition of diisocyanate and then stirring as slowly as possible after all the diisocyanate has been added. A slight vacuum of 500±150 Torr is then applied and the mixture adjusted to the main reaction temperature indicated (5). If the evolution of carbon dioxide causes excessive foaming, the reaction temperature is lowered by cooling with ice water. The progress of polyurea formation may be followed by periodically taking samples and determining their quantity of free isocyanate. When approximately 90%, by weight, of the quantity of diisocyanate introduced has been converted into polyurea, the reaction mixture is heated to temperature (6) until no more free isocyanate may be detected.

METHOD II

Emulsification of the diisocyanate is carried out continuously, but slowly, or discontinuously in small portions so that from 30 to 70%, by weight, of the diisocyanate has reacted before the remainder is introduced. Any organic compounds added as catalysts are combined with the aqueous dispersion before the diisocyanate is added. The procedure is otherwise the same as in Method I.

INDUSTRIAL METHODS

The reactions are carried out in stirrer tanks equipped with helical or crossbeam stirrers into which at least part of the aqueous dispersion is introduced. The stirrers are operated at the lowest speed. The diisocyanate is supplied from a storage vessel under nitrogen, using a steel pipe (Ermeto pipe, internal diameter 5 mm) dipped into the lower third of the liquid phase of the reaction vessel.

METHOD III

The dispersion introduced into the reaction vessel is cooled to a temperature from about 2° to 5° C. below the given main temperature (5) and continuous introduction of the diisocyanate is started. If temperature (5) is exceeded, the temperature must be reduced by intensive cooling or the rate of supply must be restricted. The procedure is otherwise the same as in Methods I and II.

METHOD IV

The procedure is the same as described for Method III, except that the dimerization or trimerization catalyst (10%, diluted in the dispersion used) is introduced after introduction of the diisocyanate. When no more free isocyanate may be detected, the catalyst is destroyed by the addition of 50%, by weight, of flowers of sulphur based on the quantity of catalyst, if tributylphosphine is used. Phospholine oxide is used analogously for partial in situ carbodiimidization.

METHOD V

The diisocyanate and from 30 to 40%, by weight, of the total quantity of dispersion are very intensively mixed with the aid of a Kenics mixer, if possible at a temperature below the temperature (5), and the remainder of the dispersion previously introduced into the stirrer vessel is fed in. The procedure is otherwise the same as in Method III.

METHOD VI

The diisocyanate is emulsified in a static mixer as described for Method V, but in this case it is emulsified in a total quantity of PUR dispersion and the mixture is fed into a stirrer vessel into which the aqueous polymer latex has been introduced. The procedure is otherwise the same as in the methods described above.

ANIONIC PUR DISPERSION A
(PUR=POLYURETHANE)

Viscosity, 40% in water at 25° C.: approximately 40 cP; particle form and diameter: spherical, approximately 0.2 μm; strong Tyndall effect.

COMPOSITION:

100.0 parts, by weight, of a polyester of adipic acid/hexane-1,6-diol/neopentyl glycol (OH number 66),
17.5 parts, by weight, of hexane-1,6-diisocyanate,
2.7 parts, by weight, of the sodium salt of ethylenediamino-2-ethane-sulphonic acid,
150.0 parts, by weight, of deionized water.

Preparation from the acetonic solution by the method according to German Auslegeschriften Nos. 1,495,745 and 2,035.732.

a glass plate using a doctor coater and the water is evaporated off at from 120° to 150° C. (from approximately 3 to 10 minutes) transparent films are obtained. The tensile strengths of films or coatings of approximately 0.2 mm in thickness is increased by from 50 to 120% of the original tensile strength (based on comparable films of the starting dispersion A) by using from 5 to 10%, by weight, of diisocyanate. Also, excellent elongation at break is obtained. As the polyurea content is increased, the surface of the film progressively loses its rubber-like hand and becomes insoluble in organic solvents and more resistant to water. Experiments 4 and 13 show that the diisocyanates mentioned there are less suitable for the process according to the present invention at the high concentration mentioned (Example 5) or completely unsuitable because not liquid at room temperature (Example 13).

The product indicated in Example 11 is particularly suitable for mixing with any other dispersions or for use as hard, dry surface coating.

EXPLANATION OF ABBREVIATIONS

Column 3=percent, by weight, (based on the total solids content, including the polyurea formed according to the present invention). The nature of the diisocyanates is as follows:

| | |
|---|---|
| IPDI | isophorone diisocyanate |
| H | hexane-1,6-diisocyanate |
| H/DPG | adduct of hexane-1,6-diisocyanate and dipropylene glycol, isocyanate content 18.3%, by weight |
| PHT | perhydrogenated diisocyanate T80 |
| PHMDI | perhydrogenated diisocyanate D44 |
| T 100 | tolylene-2,4-diisocyanate |
| T 80 | tolylene-2,4- and -2,6-diisocyanate, mixtures of isomers 80:20 |
| D44/TPG | adduct of 4,4'-diphenylmethane-diisocyanate and tripropylene glycol, isocyanate content 22.8% |
| D44 | 4,4'-diphenylmethane-diisocyanate |

Table 1:

Experimental Examples 1 to 13 with PUR the dispersion A

| No. | Method | Diisocyanate | Additives | Reaction temp, °C. Beginning | Reaction temp, °C. End | Solid, content % by wt., in water | Viscosity 25° C. | Remarks |
|---|---|---|---|---|---|---|---|---|
| 1 | 2 | 3 | 4 | 5 | 6 | 7 | 8 | 9 |
| 1 | III | 7 IPDI | — | 20 | 50 | 43 | 190 | |
| 2 | III | 10 IPDI | 2N | 18 | 40 | 42.6 | 45 | |
| 3 | V | 15 IPDI | — | 30 | 40 | 30 | 60 | |
| 4 | I | 3 H | — | 18 | 30 | 41.2 | 1500 | Stable in storage for only a few hours |
| 5 | I | 10 H | —. | 18 | 30 | 42.6 | very pasty | |
| 6 | I | 5 H/DPG | — | 18 | 30 | 41.2 | 80 | |
| 7 | I | 5 PHT | — | 20 | 40 | 41.2 | 100 | |
| 8 | II | 10 PHMDI | — | 20 | 55 | 42.6 | 45 | |
| 9 | I | 10 T100 | 3 PO | 20 | 22 | 42.6 | 50 | |
| 10 | V | 30 T80 | — | 15 | 24 | 40.0 | 80 | |
| 11 | V | 50 T80 | — | 12 | 18 | 40 | 100 | |
| 12 | II | 5 D44/TPG | — | 23 | 30 | 41.2 | 45 | |
| 13 | II | 5 D44 | — | 42 | 45 | 41.2 | 65 | approx. 3%, by wt., agglomerates 50 μm |

FILM FORMATION AND PROPERTIES

When the polyurea (PUR) dispersions prepared according to Examples 1 to 4 and 6 to 12 are spread out on Column 4=additives in percent, by weight, based on the quantity of diisocyanate

| | |
|---|---|
| N | N-methyl-diethanolamine |
| PO | phospholine oxide |

ANIONIC PUR DISPERSION B

Viscosity, 40% in water at 25° C.: approx. 30 cP, particle form and diameter: spherical, approx. 0.2 μm.
COMPOSITION:
78 parts, by weight, of adipic acid/phthalic acid/ethylene glycol polyester (OH number 64)
22 parts by weight, of phthalic acid/ethylene glycol polyester (OH number 56)
15 parts, by weight, of hexane-1,6-diisocyanate
4 parts, by weight, of the sodium salt of ethylene diamino-2-ethanesulphonic acid
179 parts, by weight, of deionized water.

Preparation according to German Auslegeschrift No. 1,495,847 and German Offenlegungsschrift No. 2,035,732 from the acetonic solution.

EXPERIMENTAL EXAMPLES USING PUR DISPERSION B

| No. 1 | Method 2 | Diiso- cyanate 3 | Addi- tive 4 | Reaction temp. Begin- ing 5 | End 6 | Solids con- tent 7 | Viscos- ity at 25° C. 8 | Remarks 9 |
|---|---|---|---|---|---|---|---|---|
| 14 | III | 10 IPDI | 2N | 15 | 45 | 42.6 | 121 | |
| 15 | II | 10 PHMDI | 3N | 20 | 55 | 42.6 | 135 | |
| 16 | I | 5 H | — | 20 | 60 | 41.2 | 1200 (8700)$^{(1)}$ | becomes pasty on storage |

The dispersions prepared according to Examples 14 and 15, which are stable in storage, differ from the pure dispersion B in drying to form a dry, transparent film having high water-resistance at from 50° to 110° C.

ANIONIC PUR DISPERSION C

Viscosity, 40% in water at 25° C.: approx. 30 cP, particle form and diameter: spherical, 0.1 μm.
COMPOSITION:
100.0 parts, by weight, of a polyester of adipic acid and butane-1,4-diol (OH number 50)
12.0 parts, by weight, of tolylene diisocyanate, mixture of isomers 2,4:2,6=65:35
2.5 parts, by weight, of the sodium salt of ethylene diamino-2-ethanesulphonic acid
172.0 parts, by weight, of deionized water.

Preparation according to German Auslegeschrift No. 1,495,745 and German Offenlegungsschrift No. 2,035,732 from the acetonic solution.

EXPERIMENTAL EXAMPLES USING PUR DISPERSION C

| No. 1 | Meth- od 2 | Diiso- cyanate 3 | Addi- tive 4 | Reaction temp. Begin- ing 5 | End 6 | Sol- ids con- tent 7 | Viscosity at 25° C. 8 |
|---|---|---|---|---|---|---|---|
| 17 | II | 10 T80 | — | 20 | 20 | 42.6 | 400 |
| 18 | III | 15 T80 | — | 13 | 15 | 40.0 | 50 |
| 19 | V | 30 T80 | — | 13 | 15 | 40.0 | 65 |

The anhydrous films and coatings from Examples 18 and 19 have an exceptionally high tensile strength, from 400 to 470 kp/cm², and elongation at break, from 600 to 850%. They also remain transparent at temperatures above 10° C. since crystallization of the product which has not been modified according to the present invention (tensile strength 210 kg/cm², elongation at break 870%) is greatly retarded. In addition, the water-resistance of polyurea (PUR) coatings is greatly increased and at the same time the swelling in organic solvents is reduced.

PREPARATION OF ANIONIC PUR DISPERSION D

REACTION MIXTURE
85 parts, by weight, of a polypropylene glycol polyether (OH number 197) (PE) which has been started on bisphenol A
15 parts, by weight, of a propoxylated adduct of 2-butenediol-(1,4) and NaHSO$_3$ (OH number 264, 76% in toluene) (AD)
44 parts, by weight, of hexamethylene-(1,6)-diisocyanate (H)
11 parts, by weight, of urea
350 parts, by weight, of deionized water
25 parts, by weight, of formaldehyde (30% in water).
METHOD The polyether (PE) and adduct (AD) are dehydrated at 110° C. in a water jet vacuum with stirring for one hour and then cooled to 70° C. The diisocyanate (H) is added and the mixture is stirred at 80° C. until the isocyanate content is 5.2%. Urea is then added and the mixture heated to 125° C. and stirred. When the melt is free from isocyanate groups, it is cooled to 100° C. and water (at 80° C.) is stirred in. Stirring is continued for about one hour before formaldehyde is added and the mixture is then stirred for about one more hour at 70° C.

EXPERIMENTAL EXAMPLE 20 (using PUR dispersion D)

The reaction mixture is now cooled to room temperature and reacted with 18 parts, by weight, of isophorone diisocyanate by Method III. The dispersion is then stirred at approximately 20° C. until it contains no more free isocyanate groups and the temperature is raised to approximately 50° C. towards the end of the reaction. The resulting dispersion has a solids content of 29.3%, a Ford cup viscosity (4 mm nozzle) equivalent to 11.3 seconds and a pH of 6.1. The dispersion shows a Tyndall effect in transmitted light.

DRESSING OF NATURAL LEATHER

A chrome tanned, unbuffed natural leather is primed in the conventional manner using casein body dyes and polymer binders (see Bergmann-Grossmann, Handbuch der Gerbereichemie und Lederfabrikation, Vol. III, part 1, page 699 et seq, Springer Verlag Wien, 1961) and dressed by spraying with the following aqueous liquor:

650 parts of the modified dispersion from Example 20, 30 parts of an aqueous silicone oil emulsion and 320 parts of water (quantity applied approx. 20 g of liquor/qfs of leather).

After drying at room temperature, the dressed leather is ironed at from 120° to 140° C. under a pressure of 100 excess atmospheres. It suffers no damage by this treatment. Leather which is dressed with unmodified PUR dispersion D is damaged by ironing at a temperature of only 80° C. and sticks to the ironing press.

RESULTS OF EXPERIMENTAL EXAMPLE 20

The following Table contains the fastness values of three leathers which have been treated with different dressings:
(I) dressing with dispersion from Example 20
(II) dressing with dispersion D, i.e. without isocyanate modification
(III) dressing analogous to (II), but with acid catalyzed polycondensation of the methylolurea groups.

|  | I | II | III |
|---|---|---|---|
| Rub test, wet, cycles with 1kg load | about 450 | 20–30 | 250–400 |
| Rub test, dry, cycles with 1 kg load | about 1000 | about 1000 | about 1000 |
| Rub test with alcohol, cycles with 1 kg load | about 25 | 5–10 | 25 |
| Rub test with acetone, cycles with 1 kg load | about 15 | 2–3 | 10 |
| Resistance to hot ironing over edge without damage | 150° C. | 70°–80° C. | 80° C. |
| Resistance to hot ironing with ironing press without damage | 140° C. | 80° C. | 80° C. |
| Repeated flexing test (wet) 20000 flexes / Repeated flexing test (dry) 100000 flexes | without damage | with slight damage | with slight damage |
| Adherence (wet) | good | good | good |

PREPARATION OF ANIONIC PUR DISPERSION E 7.58 kg of polypropylene glycol (linear, OH number 56) (PPG)
2.51 kg of propylene oxide ether (OH number 197) (PE) started on bisphenol A
2.02 kg of propoxylated adduct of 2-butenediol-(1,4) and $NaHSO_3$ (OH number 236) (Ad)
3.88 kg of tolylene diisocyanate, 2,4/2,6 isomers as 80:20 (T80)
25.00 kg of deionized water 0.056 kg of hydrazine hydrate ⎫
1.33 kg of isophorone diamine ⎭ amine mixture

METHOD

The three diols PPG, PE and AD are dehydrated at 110° C. in a water jet vacuum for 45 minutes with stirring. They are cooled to 40° C. and T80 is added. Stirring is continued at a temperature below 55° C. until the isocyanate content is 5.4%. The vessel is cooled to approximately 25° C. and the contents are dispersed using Lewatit water with rapid stirring. The reaction mixture should be slightly cooled at this stage to prevent evolution of $CO_2$. After 5 minutes' stirring, the amine mixture is introduced dropwise into 0.5 kg of water. After a further 5 minutes' stirring, a dispersion having a solids content of 40.2%, a viscosity of 20 cP and a pH of 8 is obtained. The dispersion shows a pronounced Tyndall effect in transmitted light.

EXPERIMENTAL EXAMPLES 21 to 23 USING PUR DISPERSION E

PUR dispersion E is reacted with 5%, 10% and 15% of T80 (based on the solids content) by Method III at a temperature of 15° C. which is raised to 20° C. toward the end of the reaction and the reaction is continued until no free isocyanate groups may be detected.

The following products are obtained. They are tested as adhesives for bonding wood-Resopal:

| Experimental Examples | 21 | 22 | 23 |
|---|---|---|---|
| Dispersion E | 10,000 g | 10,000 g | 10,000 g |
| T80 | 201 g (5%) | 402 g (10%) | 603 g (15%) |
| Solids content | 41.35% | 42.5% | 43.6% |
| Viscosity | 20 cP | 20 cP | 20 cP |
| pH | 6.1 | 6.1 | 6.1 |
| Volumetric swelling of the film in water | 52% | 26.5% | 8.5% |

| PROPERTIES AS ADHESIVES | | | |
|---|---|---|---|
| Experimental Examples | 21 | 22 | 23 |
| $kp/cm^2$ 1 hour wood on wood | 111 HA | 116 HA | 107 HA |
| 24 hours | 125 HA | 90 HA | 111 HA |
| 9 days | 118 HA | 131 HA | 96 HA |
| $kp/cm^2$ 1 hour wood-Resopal | 79* | 77* | 46* |
| 24 hours | 93* | 77* | 55* |
| 9 days | 65* | 77* | 35* |

HA = wood torn out
* = Resopal torn

EXPERIMENTAL EXAMPLE 24 USING PUR DISPERSION E

Polyurethane dispersion E is mixed with a 32.0% polymer dispersion (copolymer of butadiene with 35% acrylonitrile) in a ratio of solids of 4:1 and the mixture is reacted according to the present invention with 5% diisocyanate T 65 at from 15° to 20° C. by Method III.

resistance, swelling in water, mechanical properties and surface quality.

Experimental Examples Using Pur Dispersion F and Polymer Latices

| No. 1 | Polymer latex 2 | Method 3 | Diisocyanate 4 | Reaction temperature Beginning 5 | End 6 | Solids content %, by wt. 7 | Viscosity at 25° C. cP 8 |
|---|---|---|---|---|---|---|---|
| 27 | a | VI | 5 T80 | 20 | 20 | 33.6 | 2500 |
| 28 | a | VI | 10 T80 | 20 | 20 | 33.6 | 2950 |
| 29 | b | VI | 10 T80 | 20 | 40 | 32.0 | 3200 |
| 30 | c | VI | 10 T80 | 20 | 30 | 37.6 | 4350 |
| 31 | a | VI | 15 T80 | 20 | 20 | 30 | 4100 |

The pure polymer latex is unsuitable for use as wood-Resopal adhesive. A mixture of the dispersion from Example 21 and the polymer dispersion in proportions of 4:1 calculated as solids content is also unsatisfactory. The dispersion described in Example 24 for wood-wood or wood-Resopal bonds, on the other hand, has the following properties:

| Wood-wood | | Wood-Resopal |
|---|---|---|
| 1 h | 114 HA | 88 |
| 24 h | 115 | 60* |
| 9 d | 105 | 80* |

HA = wood torn out
* = Resopal torn
values in kp/cm$^2$

ANIONIC PUR DISPERSION F

Viscosity, 33.5% in water at 25° C.: 6600 cP; particle form and diameter: irregularly formed platelets and needles measuring from 0.05 to 5 μm.

172.0 parts, by weight, of a polyester of adipic acid, hexane-1,6-diol and neopentyl glycol, OH number 66

37.0 parts, by weight, of the sodium salt of ethylenediamino-2-ethane sulphonic acid 458.0 parts, by weight, of deionized water.

Solvent-free, continuous preparation according to German Offenlegungsschrift No. 2,311,635 using an impeller homogenizing machine.

Experimental Examples Using Pur Dispersion F

| No. 1 | Method 2 | Diisocyanate 3 | Additive 4 | Reaction temp. Beginning 5 | End 6 | Solids contents %, by wt. 7 | Viscosity at 25° C. in cP 8 |
|---|---|---|---|---|---|---|---|
| 25 | IV | 15 H | 2 TBP | 15 | 22 | 25 | 2.800 |
| 26 | IV | 15 T65 | 1 TBP | 15 | 20 | 29 | 4.100 |

LEGEND:
Column 3 T 65 = 2,4- and 2,6-tolylenediisocyanate, isomeric ratio = 65:35
Column 4 TBP = tributylphosphine The dispersions of these experimental Examples are particularly suitable for a textile coating (experiment 26 as bonding layer and experiment 25 as top coating layer) since the diisocyanate modification according to the present invention improves the chemical dry cleaning LEGEND:
Column 2 = PUR polymer ratio of solids contents 1:1
a = 40% aqueous latex of a copolymer of butadiene/butylmethacrylate and 15%, by weight, of acrylonitrile
b = 40% aqueous latex of a copolymer of butadiene and 15%, by weight, of acrylonitrile
c = 50% aqueous latex of a copolymer of butyl acrylate with 5%, by weight, of acrylonitrile.

The transparent films prepared from the stable dispersion at from 80° to 110° C. have the following properties:

| Experimental product | Tensile strength kp/cm$^2$ | Elongation at break % | Tensile strength after storage in water at 20° C. 1 hour | 24 hours |
|---|---|---|---|---|
| 27 | 113 | 650 | ++ | + |
| 28 | 148 | 680 | +++ | ++ |
| 29 | 140 | 590 | ++ | ++ |
| 30 | 155 | 620 | +++ | +++ |
| 31 | 180 | 680 | +++ | +++ |

LEGEND:
+++ virtually unchanged
++ slightly reduced
+ substantially reduced

Comparative Values of Films Obtained From the Dispersions Before They Are Enveloped With Polyurea

| DISPERSION | Tensile strength at break kp/cm$^2$ | Elongation % |
|---|---|---|
| PUR dispersion F | 118 | 890 |
| Copolymer a | 12 | 1650 |
| Copolymer b | 29 | 650 |
| Copolymer c | 31 | 720 |
| PUR dispersion F + copolymer a ratio of solids content 1:1 | 55 | 1450 |

The tensile strength of the comparison samples is too low to be satisfactory after one hour's storage in water at 20° C.

ANIONIC PUR DISPERSION G

Viscosity; 47% in water: 3850 cP; particle form and diameter: irregularly formed platelets and needles measuring from 0.03 to 2 μm.

COMPOSITION:

2,500 parts, by weight, of a prepolymer containing 3.9%, by weight, of free isocyanate groups and obtained from polypropylene oxide, OH number 56, and tolylene diisocyanate (ratio of isomers 2,4:2,6=65:35)
125 parts, by weight, of the sodium salt of ethylene diamino-2-ethanesulphonic acid
2,630 parts, by weight, of deionized water.

The dispersion is prepared continuously and without solvent by the method according to German Offenlegungsschrift No. 2,311,635 using an impeller homogenizing machine. A film prepared at from 90° to 110° C. has a tensile strength of 22 kp/cm² and an elongation at break of 1150%.

EXPERIMENTAL EXAMPLE 32 (using PUR dispersion G)

When 10%, by weight, of diisocyanate T 80 (based on the total solids content) is used to envelop the dispersion with polyurea by Method I at room temperature, the resulting dispersion has a viscosity (at a concentration of 40% in water) of 2950 cP/25° C. The tensile strength of a film obtained from it at 100° C. is 97 kp/cm² and the film has an elongation at break of 630%. The dispersion is particularly suitable for use as bonding coat for textiles because of its softness.

CATIONIC DISPERSION H

Viscosity, 30% in water at 25° C.: 30 cP; particle form and diameter: spherical, from 0.05 to 0.20 μm; pronounced Tyndall effect.

COMPOSITION:
23.0 parts, by weight, of adipic acid/phthalic acid polyester (OH number 64)
77.0 parts, by weight, of phthalic acid/ethylene glycol polyester (OH number 56)
14.0 parts, by weight, of hexane-1,6-diisocyanate
2.2 parts, by weight, of N-methyl-diethanolamine
0.5 part, by weight, of 1,2-diaminopropane
2.2 parts, by weight, of dimethylsulphate
277.0 parts, by weight of deionized water.

The dispersion is prepared by the method given in German Auslegeschrift No. 1,495,745.

EXPERIMENTAL EXAMPLE 32 USING PUR DISPERSION H

When the dispersion is enveloped with polyurea by Method I, using 5%, by weight, of diisocyanate IPDI at from 15° to 23° C., the viscosity of the 30% dispersion in water is virtually unchanged. When water is removed at approximately 100° C., a transparent film is obtained, which does not block at temperatures in the region of 175° C. and adheres more firmly to glass than a film obtained from the pure dispersion H. The water-resistance is considerably improved.

If the addition of diisocyanate is carried out at temperatures above 30° C., a sharp increase in viscosity occurs within a short time. The dispersion then solidifies to a crumbly mass within one hour.

NON-IONIC DISPERSION I

Viscosity, 50% in water at 25° C.: approx. 50 cP; particle size and diameter: spherical, approx. 0.2 μm.

COMPOSITION
92.0 parts, by weight, of an adipic acid/hexanediol/neopentyl glycol polyester (OH number 66),
8.0 parts, by weight, of a reaction product of a polyethylene oxide ether which has been started on n-butanol, hexane-1,6-diisocyanate and diethanolamine used in a molar ratio of 1:1:1, having an OH number of 50,
14.0 parts, by weight, of isophorone diisocyanate
10.0 parts, by weight, of hexane-1,6-diisocyanate
4.3 parts, by weight, of isophorone diamine
1.3 parts, by weight, of hydrazine monohydrate
130.0 parts, by weight, of deionized water.

The polyaddition reactions are carried out as indicated in German Offenlegungsschrift No. 2,314,512.

EXPERIMENTAL EXAMPLE 33 USING PUR DISPERSION I

When the dispersion is exposed to the action of 15%, by weight, based on the total solids content, of diisocyanate IPDI by Method III at from 15° to 20° C. in the presence of a catalytic quantity of a water-soluble organic compound containing tertiary nitrogen, the dispersion, which is thereby enveloped in polyurea, undergoes only a slight increase in viscosity. Owing to its increased hardness and tensile strength and resistance to water and chemical dry cleaning agents, it is eminently suitable for use as a light-stable surface coating while the unmodified dispersion I is suitable for use as bonding coat by virtue of its properties.

NON-IONIC PUR DISPERSION K

COMPOSITION:
63 parts, by weight, of an adipic acid/butanediol polyester (OH number 50) (PE)
24 parts, by weight, of a polypropylene glycol polyether (OH number 197) (PET) started on bisphenol A
13 parts, by weight, of a polypropylene polyethylene glycol polyester started on butanol (ratio of propylene oxide: ethylene oxide=85:15, OH number 26) (dispersing agent)
27 parts, by weight, of hexamethylene-1,6-diisocyanate
7.6 parts, by weight, of isophoronediamine
1 part, by weight, of hydrazine hydrate
205 parts, by weight, of deionized water
320 parts, by weight, of acetone.

METHOD:
The polyester (PE) and polyether (PET) and (dispersing agent) are dehydrated in a water jet vacuum at 110° C. for one hour with stirring and then cooled to 70° C. Diisocyanate is added and the mixture stirred at 100° C. until the isocyanate content is 5.7%. 300 g of acetone are then stirred in. The solution in acetone of the prepolymer which has isocyanate end groups is chain-lengthened using the two amines, the isophorone diamine having previously been diluted with 20 g of acetone. After chain-lengthening of the oligourethane with the amines, the polyurethane is precipitated with water to form a dispersion. The acetone is then distilled off until the acetone content is below 1%.

EXPERIMENTAL EXAMPLE 34 USING PUR DISPERSION K

The enveloping polyurea is formed using 17 parts, by weight, of isophorone diisocyanate at room temperature as in experimental Example 32. A dispersion having a Ford cup viscosity (4 mm nozzle) equivalent to 14 seconds and a solids content of 40% is obtained. The pH is 6.0. The dispersion shows a Tyndall effect in transmitted light.

DRESSING OF GRAIN LEATHER

A chrome tanned, unbuffed grain leather is primed using the following liquor:

100 parts, by weight, of Eukanol dyes (Bayer AG)
70 parts, by weight, of Isoderm matting LA 86 (Bayer AG)
535 parts, by weight, of water
75 parts, by weight, of the polyurethane dispersion from Example 34
200 parts, by weight, of Eukanol binder IM (Bayer AG)
20 parts, by weight, of a silicone oil emulsion.

The liquor is sprayed on twice. After drying at 90° C., the leather is ironed on an ironing press at a pressure of 100 excess atmospheres. It is then dressed by spraying with the following liquor:
465 parts, by weight, of the polyurethane dispersion from Example 34
30 parts, by weight, of an aqueous silicone oil emulsion
480 parts, by weight, of water and
25 parts, by weight, of Acrafix CN (melamine resin).

After drying at room temperature, the dressed leather is ironed at 120° C. and 100 excess atmospheres. Leather dressed using unmodified dispersion K is damaged when ironed at temperatures above 80° C.

I Dressing using the dispersion according to the present invention of Example 34.
II Dressing using dispersion K, i.e., without isocyanate modification.

| | | | |
|---|---|---|---|
| Wet abrasion (1 kg load) | | 250–300 | 20–30 |
| Dry abrasion (1 kg load) | approx. | 1000 approx. | 1000 |
| Alcohol abrasion (1 kg load) | | 20–25 | 5–10 |
| Acetone abrasion (1 kg load) | | 10–15 | 2–3 |
| Resistance to hot ironing over an edge | | 150° C. | 80° C. |
| Resistance to hot ironing using ironing machine | | 120° C. | 80° C. |
| Sharp bending (wet) 20,000 | ) | without damage | with considerable damage |
| Sharp bending (dry) 100,000 | ) | | |
| Adherence (wet) | | good | good |

What is claimed is:

1. A process for preparing modified aqueous synthetic resin dispersions with a solids content of from 10 to 60%, by weight, wherein the proportion of nonpolyurethane polymerization products comprises up to 70% by weight based on the total solids content, comprising introducing, 1.5 to 80% by weight, based on the total solids content in the modified synthetic resin dispersions, of organic diisocyanates having an average molecular weight of 400 or less and which diisocyanates are liquid at room temperature into polyurethane-containing, non-sedimenting, aqueous synthetic resin dispersions, optionally in the presence of catalysts which accelerate the isocyanate polyaddition reaction and/or the dimerization of isocyanate groups and/or the carbodiimidization of isocyanate groups and/or the trimerization of isocyanate groups, mixing the organic diisocyanate with the aqueous dispersion at a temperature at which no visible foaming occurs, maintaining the temperature after addition of all the diisocyanate until at least 50% of the isocyanate groups in the added diisocyanate have undergone reaction, and if desired, completing the reaction by subsequently heating to temperatures up to 100° C.

2. The process of claim 1 wherein the temperature of the reaction mixture during the introduction of the diisocyanate into the dispersion is from 0° to 50° C.

3. The process of claim 2 wherein the temperature is from 10° to 30° C.

4. The process of claim 1 wherein from 3 to 50% of diisocyanate is used.

5. The process of claim 1 wherein the diisocyanate is hexamethylene diisocyanate and is used in a quantity of from 1.5 to 5% by weight.

6. Modified synthetic resin dispersions prepared by the process of claim 1.

* * * * *